United States Patent
Duijzings et al.

(10) Patent No.: US 6,812,283 B2
(45) Date of Patent: Nov. 2, 2004

(54) METHOD FOR AGGLOMERATING DISPERSED RUBBER

(75) Inventors: Wil Duijzings, Ludwigshafen (DE); Sabine Oepen, Ellerstadt (DE); Norbert Niessner, Friedelsheim (DE); Michael Breulmann, Mannheim (DE); Hardy Korb, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/333,612

(22) PCT Filed: Jul. 13, 2001

(86) PCT No.: PCT/EP01/08114

§ 371 (c)(1),
(2), (4) Date: Jan. 22, 2003

(87) PCT Pub. No.: WO02/10222

PCT Pub. Date: Feb. 7, 2002

(65) Prior Publication Data

US 2003/0181583 A1 Sep. 25, 2003

(30) Foreign Application Priority Data

Jul. 28, 2000 (DE) .......................................... 100 37 280

(51) Int. Cl.⁷ ............................................... C08L 31/02

(52) U.S. Cl. .............................. 525/67; 525/80; 525/87; 525/64; 525/71; 525/84

(58) Field of Search .............................. 525/67, 80, 87, 525/64, 71, 84; 524/502

(56) References Cited

U.S. PATENT DOCUMENTS 3,049,501 A    8/1962   Howland

FOREIGN PATENT DOCUMENTS

| DE | 1 669 735 | | 6/1971 |
| EP | 77 038 | | 4/1983 |
| EP | 517 539 | | 12/1992 |
| EP | 0 517 539 A1 | * | 12/1992 |
| GB | 859 361 | * | 9/1959 |

OTHER PUBLICATIONS

Keppler et al., Agglomeration von Polymerization . . . 1–25.

* cited by examiner

Primary Examiner—Ling-Siu Choi
(74) Attorney, Agent, or Firm—Keil & Weinkauf

(57) ABSTRACT

A process for the agglomeration of at least one rubber (A), dispersed in an aqueous phase, by the addition of a dispersion of at least one agglomerating polymer (B) in aqueous phase, in which the agglomerating polymer B used is one containing substantially no free acid groups and the agglomeration is carried out in the presence of at least one basic electrolyte.

7 Claims, No Drawings

METHOD FOR AGGLOMERATING DISPERSED RUBBER

The invention relates to a process for the agglomeration of at least one rubber (A), dispersed in an aqueous phase, by the addition of an aqueous dispersion of at least one agglomerating polymer (B).

Methods of enlarging rubber particles are known to the person skilled in the art. One variant comprises agglomeration effected during polymerization of the rubber-forming monomers. Another method comprises the agglomeration of the substantially fully polymerized dispersed rubber. In the latter process there is also the problem that the dispersion, in addition to the desired agglomeration, forms coagulum (unstable, being over-large agglomerate). The coagulum impairs the mechanical properties of the end product. Furthermore, coagulation reduces the yield of product. High yields are particularly important, especially in the case of plants operated on a large scale. In addition, when coagulum forms, the plant must be cleaned more often. Thus it is always desirable to minimize coagulation.

In EP-A 77038 describes the agglomeration of a dispersed rubber in the presence of a dispersion of an acid-group-containing agglomerating latex and in the presence of a neutral electrolyte. Since the agglomerating latex contains free acid groups, the agglomeration must be carried out at a pH of higher than 7, in order to dissociate the acid. This process suffers from the drawback that, owing to the free acid groups in the latex, the efficiency of the agglomeration is strongly influenced by pH fluctuations. The pH must thus be tuned very finely in order to obtain reproducible results. This is feasible in large-scale production plants only at high expense. The chlorides proposed as neutral electrolytes suffer from the further drawback that they corrode the reaction vessels and pollute the wastewater, and even residues of these salts lead to corrosion problems during processing. It was also known from EP-A 517 539 that rubbers can be agglomerated with emulsion polymers containing at least 30% of units containing carboxylic acid groups. U.S. Pat. No. 3,049,501 discloses an agglomeration method in which polyvinyl methyl ether containing acid groups is used at a pH from 8 to 11. GB-A 859 361 proposes an agglomerating latex free from acid groups, together with an ammonium salt electrolyte.

The processes proposed in these publications do not adequately prevent the formation of coagulum. Moreover, the use of volatile electrolytes may lead to problems such as foaming of the reaction mixture.

Agglomerating latices exhibiting no free acid groups and capable of causing agglomeration intrinsically, i.e., independently of whether the pH is above 7 during agglomeration or not, have been disclosed in H.-G. Keppler, H. Wesslau, J. Stabenow, Angew. Makromol. Chem. 2 (1968) pages 1 to 25.

It is an object of the invention to find a process by means of which dispersed rubber particles can be efficiently agglomerated, especially in large-scale production, with the formation of coagulum minimized.

Accordingly we have found a process for the agglomeration of at least one rubber (A), dispersed in an aqueous phase, by the addition of a dispersion of at least one agglomerating polymer (B) in aqueous phase, in which an agglomerating polymer containing substantially no free acid groups is used and in which the agglomeration is carried out in the presence of at least one basic electrolyte. We have also found graft polymers (C) obtainable from said agglomerated rubbers. We have also found thermoplastic molding compositions (D) which comprise said graft polymers C and can be used for the preparation of shaped articles, films or fibers.

The rubbers A underlying the process of the invention can be multifarious. For example silicone rubbers, olefin rubbers, such as ethylene, propylene, ethylene/propylene, EPDM, diene, acrylate, ethylene-vinyl acetate rubbers or ethylene-butyl acrylate rubbers or mixtures of two or more of these rubbers can be used. Preferably, however, diene rubbers are used. Special preference is given as A to diene rubbers composed of a1) from 50 to 100% by weight of at least one diene having conjugated double bonds and a2) from 0 to 50% by weight of one or more other monoethylenically unsaturated monomers, the sum of the percentages by weight being 100.

Suitable dienes having conjugated double bonds, a1), are, in particular, butadiene, isoprene and the halogen-substituted derivatives thereof, e.g., chloroprene. Preference is given to butadiene or isoprene, particularly butadiene.

The other monoethylenically unsaturated monomers a2) which may be present in diene rubber A at the expense of monomers a1) may be, for example:

vinylaromatic monomers such as styrene and styrene derivatives of the general formula

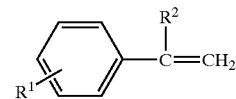

in which $R^1$ and $R^2$ independently stand for hydrogen or $C_1$–$C_8$ alkyl;

acrylonitrile, methacrylonitrile;

$C_1$–$C_4$-alkyl esters of methacrylic acid or acrylic acid such as methyl methacrylate, and also the glycidyl esters glycidyl acrylate and methacrylate;

N-substituted maleimides such as N-methyl-, N-phenyl- and N-cyclohexylmaleimides;

acrylic acid, methacrylic acid, and dicarboxylic acids such as maleic acid, fumaric acid and itaconic acid and also their acid anhydrides such as maleic anhydride;

nitrogen-functional monomers such as dimethylaminoethyl acrylate, diethylaminoethyl acrylate, vinylimidazole, vinylpyrrolidone, vinylcaprolactam, vinylcarbazole, vinylaniline, acrylamide and methacrylamide;

aromatic and araliphatic esters of acrylic acid and methacrylic acid such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers such as vinyl methyl ether, and mixtures of these monomers.

Preferred monomers a2) are styrene, acrylonitrile, methyl methacrylate, glycidyl acrylate and methacrylate or butyl acrylate.

Generally, diene rubbers A exhibit a glass transition temperature Tg of less than 0° C. (determined as specified in DIN 53765).

The synthesis of rubbers A is known to the person skilled in the art or may be carried out by methods known to the person skilled in the art. Thus diene rubbers A can be prepared in a first step in which they are not formed in a particulate state, for example via solution polymerization or gas-phase polymerization, and are then dispersed in the aqueous phase in a second step (secondary emulsification).

Heterogenous, particle-forming polymerization processes are preferred for the synthesis of rubbers A. Dispersion polymerization can be carried out in known manner by, say, the emulsion, inverse emulsion, miniemulsion, microemulsion, or microsuspension polymerization method.

Dispersion polymerization can be carried out in an organic solvent or an aqueous phase.

The rubbers A are preferably prepared in aqueous phase. By aqueous phase is meant a solution, emulsion or suspension of the corresponding monomers or polymers in water or in a solvent mixture containing a large proportion, i.e., at least 20% by weight, of water.

In one preferred embodiment, polymerization is carried out by the emulsion method, in which the monomers are polymerized in aqueous emulsion at from 20 to 100° C., preferably at from 50 to 80° C., in which case all components of the batch can be combined (batch process), or the monomer alone or an emulsion of monomer, water and emulsifiers can be gradually added to the other components (feed process). Furthermore, it is possible to carry out the reaction by a continuous method. Preference is given to the feed process.

Suitable emulsifiers are for example alkali metal salts of alkyl- or alkylaryl-sulfonic acids, alkyl sulfates, fatty alcohol sulfonates, salts of higher fatty acids containing from 10 to 30 carbons, sulfosuccinates, ether sulfonates or resin soaps. Preferably, use is made of the alkali metal salts of alkylsulfonates or fatty acids containing from 10 to 18 carbons. Their concentration is usually from 0.5 to 5% by weight, based on monomers a) (sum of monomers a1 and a2).

Preferably, the preparation of the dispersion is carried out using sufficient water to give the final dispersion a solids content of from 20 to 50% by weight.

Free-radical initiators suitable for starting the polymerization reaction are all those which decompose at the reaction temperature chosen, i.e. both those which undergo decomposition thermally and those which do so in the presence of a redox system. Suitable polymerization initiators are preferably free-radical initiators, for example peroxides such as preferably peroxodisulfates (e.g. sodium or potassium persulfate) or azo compounds such as azodiisobutyronitrile. However, redox systems, particularly those based on hydroperoxides such as cumene hydroperoxide, may alternatively be used.

Usually the polymerization initiators are used in a concentration of from 0.1 to 2% by weight, based on monomers a).

The free-radical initiators and the emulsifiers are for example placed in the reaction vessel as a single batch at the start of the reaction in batchwise mode, or are divided into a number of portions which are added batchwise at the start and at one or more intervals thereafter, or are added continuously over a specific period. This continuous addition may follow a gradient, which may, for example, be ascending or descending, linear or exponential, or stepped (step function).

Use may also be made of molecular weight regulators such as ethylhexyl thioglycolate, n- or tert-dodecyl mercaptan or other mercaptans, terpinols and dimeric α-methylstyrene or other compounds suitable for molecular weight regulation. The molecular weight regulators are added to the reaction batch batchwise or continuously as described above with reference to the free-radical initiators and emulsifiers.

The pH at which polymerization is carried out is influenced by the type of emulsifiers used. Polymerization is generally carried out at a pH of preferably from 6 to 10. Buffering agents such as $Na_2HPO_4/NaH_2PO_4$, sodium pyrophosphate, sodium hydrogencarbonate or buffers based on citric acid/citrate may also be used. Regulators and buffering agents are used in conventional amounts, so that more detailed information thereon is unnecessary here.

The diene rubbers preferably used as A may, in a special embodiment, be produced by polymerization of monomers a) in the presence of a finely divided latex ("seed latex method" of polymerization). This latex is used as the initial batch and can consist of monomers capable of forming rubber-elastic polymers, or alternatively of other monomers such as those mentioned above. Suitable seed latices consist for example of polybutadiene or polystyrene.

In one preferred embodiment of the emulsion polymerization the diene rubbers A can be produced by the feed process. In this process a specific fraction of monomers a) is used as initial batch and polymerization is initiated, after which the remainder of the monomers a) (feed fraction) is added as a feed stream during polymerization. The feed parameters (gradient shape, rate, duration, etc.) are governed by the other polymerization conditions. The same applies here, by analogy, as stated above with reference to the manner of adding free-radical initiator or emulsifier. In said feed process the fraction of monomers a) used as initial batch is preferably from 5 to 50% by weight and more preferably from 8 to 40% by weight based on a). Preferably, the feed fraction of a) is fed in over a period of from 1 to 18 hours, more preferably from 2 to 16 hours and most preferably from 4 to 12 hours.

Inverse emulsion polymerization differs from emulsion polymerization in that instead of hydrophobic monomers dispersed in an aqueous phase, use is made of hydrophilic monomers dispersed in a substantially nonaqueous phase.

Miniemulsion polymerization differs from emulsion polymerization primarily in that the mixture of monomers, water, emulsifiers and co-emulsifiers is subjected, in a first step, to high shearing forces and the polymerization reaction is carried out in a second step. This produces very fine monomer droplets. The batch is then polymerized by means of a water-soluble initiator, e.g., a persulfate. The particle size distribution of the monomer droplets usually substantially corresponds to the later particle size distribution of the polymer particles. The high shearing forces can be produced for example by ultrasound or a microfluidizer appliance, or alternatively by homogenizers. Details of the miniemulsion polymerization process may be found by the person skilled in the art in, say, P. Lovell, M. El-Aasser, Emulsion Polymerization and Emulsion Polymers, John Wiley, New York, 1997, pp. 699–722.

In microemulsion polymerization very large amounts of emulsifier are used, thereby distinguishing it from emulsion polymerization. In this way similarly large monomer droplets are produced as in miniemulsion polymerization, but in the case of microemulsion polymerization the droplets are thermodynamically stable.

In other respects the above statements concerning normal emulsion polymerization apply to both miniemulsion and microemulsion polymerization.

In microsuspension polymerization, a finely divided monomer emulsion is generally produced in a first step by the action of high shearing forces. For this purpose use is made of homogenizers, which are well known to the person skilled in the art. But compared with miniemulsion polymerization, the droplets obtained are larger. Further, there are used, in microsuspension polymerization, at least one emulsifier and at least one protective colloid.

The protective colloids suitable for stabilization of the dispersion during polymerization by the microsuspension polymerization process are water-soluble polymers, for example cellulose derivatives such as carboxymethyl cellulose and hydroxymethyl cellulose, poly(N-vinylpyrrolidone), poly(vinyl alcohol) and poly(ethylene oxide), anionic polymers such as polyacrylic acid and their copolymers, and cationic polymers such as poly(N-vinylimidazole). The concentration of these protective colloids is preferably from 0.1 to 10% by weight, based on the total mass of the dispersion.

Preference is given to the use of one or more polyvinyl alcohols as protective colloids, particularly those having a degree of hydrolysis below 96 mol %, preferably from 60 to 94 and more preferably from 65 to 92 mol %. The preferred polyvinyl alcohols have a dynamic viscosity of from 2 to 100 mPas, preferably from 4 to 60 mPas, measured on a 4% by weight strength solution in water at 20° C. according to DIN 53015.

The microsuspension polymerization is initiated using a free-radical polymerization initiator. Such compounds are known to the person skilled in the art. In particular, the initiators used are organic peroxides such as dilauryl peroxide or azo compounds such as 2,2'-azobis(2-methylbutyronitrile) or 2,2'-azobis(isobutyronitrile). Also used as free-radical polymerization initiators are monomers which spontaneously polymerize at elevated temperature.

The concentration of the initiator is usually from 0.05 to 4% by weight, based on the monomers.

Further additives such as buffering agents and molecular weight regulators can be added continuously or batchwise at the start of and/or during the preparation of the monomer dispersion and/or during polymerization.

The monomer dispersion is usually prepared at room temperature, but higher or lower temperatures may be sensible depending on the type of monomers and protective colloids used.

Preparation of the monomer dispersion may be effected batchwise or continuously. Alternatively, it is possible to disperse the components in a first step as a batch and then to subject the resulting dispersion to a second dispersing operation carried out continuously.

Polymerization is carried out in conventional manner, for example by heating the reactor contents, by which means the polymerization reaction is initiated, or, in the case of a redox initiator, by bringing the initiator into contact with the reducing agent. The polymerization temperature is governed, inter alia, by the monomers and initiators used, and also by the desired degree of crosslinking of the resulting polymers A). Generally, polymerization is carried out at from 30 to 120° C., and if desired various temperatures can be used successively, or a temperature gradient can be employed.

The polymerization reaction is usually carried out with slow or gentle agitation, during which (unlike in the case of the preceding emulsification involving high shearing forces) the droplets are not broken up further.

The particle size can thus be controlled, as already mentioned above with respect to the miniemulsion and microsuspension polymerization methods, substantially by appropriately selecting and regulating the conditions used during preparation of the dispersion (e.g., choice of homogenizer, duration of homogenization, proportions of monomers to water to protective colloids, method of dispersion used (once, twice or more times, as a batch or continuously, with or without recirculation), speed of rotation of the homogenizer, etc.).

The precise polymerization conditions, particularly as regards the type, amount and metering of the emulsifier and other polymerization auxiliaries, are preferably selected such that the resulting particles of rubbers A obtained by emulsion polymerization have a mean particle size (weight-average particle size $d_{50}$) usually from 50 to 500 and preferably from 70 to 300 and more preferably from 80 to 140 nm. The rubbers A obtained by miniemulsion polymerization usually have particle sizes of from 50 to 500 nm (weight-average particle size $d_{50}$). Microemulsion polymerization produces particle sizes (weight-average particle sizes $d_{50}$) in the range of from 20 to 80 nm. The particle sizes stated always refer to the $d_{50}$ value (weight average, determined by analytical ultracentrifuge measurements as described by W. Mächtle, S. Harding (Eds.), AUC in Biochemistry and Polymer Science, Cambridge, Royal Society of Chemistry UK 1992 pp. 1447–1475).

The method of microsuspension polymerization generally produces particles having a size (weight-average particle size $d_{50}$) in the range of from 0.3 to 10 μm. The particle sizes can be determined by the method of Fraunhofer diffraction (H. G. Barth, Modern Methods of Particle Size Analysis, Wiley, N.Y. 1984).

The monomers a) are polymerized conventionally up to a conversion of usually at least 90% and preferably greater than 95%, based on the monomers used.

The rubber A dispersed in the aqueous phase is then agglomerated according to the invention. There may be more than one, for example two or more, rubbers present in the dispersion. This can be achieved e.g., by mixing dispersions of different rubbers. Agglomeration is achieved by the addition of a dispersion of the agglomerating polymer B and the basic electrolyte.

In the present invention, B contains substantially no free acid groups, i.e., B contains, if at all, only free acid groups which might have come about through impurities or side reactions during manufacture of B. Examples of suitable agglomerating polymers are copolymers containing polar comonomers. Suitable agglomerating polymers include copolymers of $C_1$–$C_{12}$ alkyl acrylates or $C_1$–$C_{12}$ alkyl methacrylates and polar comonomers such as acrylamide, methacrylamide, ethacrylamide, n-butylacrylamide or maleamide.

It is preferred to use copolymers of
b1) from 80 to 99.9% by weight of ($C_1$–$C_4$-alkyl) esters of acrylic acid and
b2) from 0.1 to 20% by weight and preferably from 0.1 to 10% by weight of acrylamides,
the sum of monomers b1) and b2) being 100% by weight. The monomers b1) used may be mixtures of various acrylates. Monomer b1) is preferably ethyl acrylate. Preferred monomers b2) include acrylamide, methacrylamide, N-methylolmethacrylamide or N-vinylpyrrolidone or mixtures of said compounds. B is very preferably a copolymer of from 92 to 99% by weight of ethyl acrylate and from 1 to 8% by weight of methacrylamide. Preferred agglomerating polymers B include those having a molecular weight (weight average $M_w$) of from 30,000 to 300,000 g/mol.

The concentration of the agglomerating polymers in the dispersion used for agglomeration should generally be in the range from 3 to 60% by weight and preferably from 5 to 40% by weight. The agglomerating dispersion may, if desired, comprise a mixture of, say, two or more different agglomerating polymers. Preferably B is dispersed in an aqueous phase.

Agglomeration is usually carried out using from 0.1 to 5 and preferably from 0.5 to 3 parts by weight of the agglomerating dispersion per 100 parts by weight of the rubber, each based on solids.

The agglomeration is preferably carried out at a temperature of from 20 to 120° C. and more preferably from 30 to 100° C. The addition of B can take place all at once or in portions, continuously or according to a feed profile over a certain period of time. In a preferred embodiment, the addition of B is carried out in such a manner that 1/1 to 1/100 of the total amount of B are introduced per minute. The agglomerating time is preferably from 1 minute to several hours, for example up to two hours, and more preferably from 10 to 60 minutes.

In accordance with the invention, suitable basic electrolytes include organic or inorganic hydroxides. Inorganic hydroxides are especially suitable. Monovalent basic electrolytes are preferred. Particular preference is given to the use of lithium hydroxide, sodium hydroxide or potassium hydroxide. In one preferred embodiment, KOH is used as basic electrolyte. In another preferred embodiment, NaOH is used as basic electrolyte. Additionally, however, mixtures of two or more basic electrolytes can be used. This can be advantageous, for example, when it is desired to exert precise control over the growth of the rubber particles. Thus it can be advantageous, for example, to use mixtures of LiOH with KOH or mixtures of LiOH with NaOH. Using mixtures of KOH and NaOH is a further option and a further preferred embodiment.

Generally, the electrolytes are dissolved prior to being added. The preferred solvent is the aqueous phase. Preference is given to the use of dilute solutions, e.g., solutions with a concentration in the range from 0.001 to 0.1, particularly in the range from 0.001 to 0.05, more preferably less than 0.03, e.g., less than 0.025 g, of basic electrolyte per mL of solvent. The addition of the basic electrolytes can take place prior to the addition of the agglomerating polymer, simultaneously therewith or separately or following the addition of B. An alternative possibility is to premix the basic electrolytes in the dispersion of B. In a preferred embodiment, the addition of the basic electrolytes is carried out prior to the addition of the agglomerating polymer. Usually the basic electrolyte is used in an amount ranging from 0.01 to 4, preferably from 0.05 to 2.5, particularly from 0.1 to 1.5% by weight, based on rubber A (as solids).

The pH during agglomeration is generally from 6 to 13. In a preferred embodiment it is from 8 to 13.

The agglomerated rubbers A produced by the process of the invention are suitable for use as graft base for the synthesis of graft polymers (C). Theoretically, the rubbers can be grafted with a very wide variety of unsaturated compounds. Appropriate compounds and methods are known to the person skilled in the art. Preference is given to graft polymers C which contain (based on C and solids)

c1) from 30 to 95, preferably from 40 to 90 and more preferably from 40 to 85% by weight of graft base and c2) from 5 to 70, preferably from 10 to 60, and more preferably from 15 to 60% by weight of a graft component.

Preference is given to a graft component c2) comprising c21) from 50 to 100, preferably from 60 to 100 and more preferably from 65 to 100% by weight of a styrene compound of the general formula

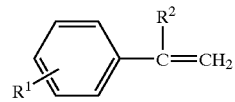

in which $R^1$ and $R^2$ independently stand for hydrogen or $C_1$–$C_8$-alkyl, c22) from 0 to 40%, preferably from 0 to 38% and more preferably from 0 to 35% by weight of acrylonitrile or methacrylonitrile or a mixture thereof, c23) from 0 to 40, preferably from 0 to 30 and more preferably from 0 to 20% by weight of one or more further monoethylenically unsaturated monomers.

The graft component c2) can be produced in one or more process steps. The monomers c21), c22) and c23) may be added individually or intermixed. The ratio of the monomers in the mixture may be constant in time or follow a gradient. Alternatively, combinations of these methods can be used.

For example, first of all styrene alone and then a mixture of styrene and acrylonitrile can be polymerized onto graft base c1).

If desired, however, other monomers c2) can be used, for example methyl methacrylate. Furthermore, component c2) may contain, at the expense of monomers c21) and c22), one or more other monoethylenically unsaturated monomers c23). As regards monomers c23), reference is made to the remarks concerning component a13).

Preferred graft components c2) are for example polystyrene and copolymers of styrene and/or α-methylstyrene with one or more of the other monomers described under c22) and c23). Preference is given to methyl methacrylate, N-phenylmaleimide, maleic anhydride and acrylonitrile and more preferably to methyl methacrylate and acrylonitrile.

As examples of preferred graft components c2) there may be mentioned:

c2-1: polystyrene
c2-2: copolymer of styrene and acrylonitrile,
c2-3: copolymer of α-methylstyrene and acrylonitrile,
c2-4: copolymers of styrene and methyl methacrylate.

The amount of styrene or α-methylstyrene, or the total amount of styrene and α-methylstyrene, is very preferably at least 40% by weight, based on c2).

The graft polymers can be used for the preparation of thermoplastic molding compositions and are for this purpose mixed with one or more other polymers. In this case the graft component c2) acts as compatibility promoter between graft base c1) and the matrix polymer into which the graft polymers C are embedded. Preferably, therefore, monomers c2) are the same as those of the matrix. If the matrix consists entirely or predominantly of a poly(styrene-co-acrylonitrile) (SAN), the graft component as well will usually entirely or predominantly consist of styrene and/or α-methylstyrene and acrylonitrile.

Graft component c2) is generally polymerized in emulsion in the presence of the agglomerated rubber A. The process is usually carried out at from 20 to 100° C. and preferably from 50 to 80° C. In a manner similar to that described above regarding the preparation of the rubber, grafting can take place as a batch process, a feed process or a continuous process.

The polymerization initiator used for the graft component can comprise the same water-soluble compounds as employed during polymerization of the graft base. In the same way use can be made of oil-soluble initiators or initiators that are soluble in the monomer, examples being dialkyl peroxides such as dilauryl peroxide and dibenzyl peroxide, per esters such as tert-butyl perpivalate and tert-butyl peroxyneodecanoate, further diperoxyketals, peroxycarbonates and azo compounds such as azodiisobutyronitrile (azobisisobutyronitrile, AIBN) and azodiisovaleronitrile (ADVN). Furthermore, hydroperoxides, particularly cumene hydroperoxide, are suitable as polymerization initiators.

Details on how to carry out the grafting reaction in emulsion may be found, for example, in DE-A 24 27 960 and EP-A 62901.

The gross composition of the graft polymers C is not affected by the stated embodiments of the process.

Also suitable are graft polymers having a number of "soft" and "hard" stages, e.g., having the structure c1)-c2)-c1)-c2) or c2)-c1)-c2), particularly in the case of larger particles.

If grafting is accompanied by the formation of ungrafted polymers of the monomers c2), these amounts, which are usually below 10% by weight of c2), are assigned to the mass of component C.

Graft copolymers C are, for the preparation of thermoplastic molding compositions (D), preferably blended with at least one matrix polymer and optionally other components. These are described below.

Examples of suitable matrix polymers d1) are amorphous polymers.

Examples thereof are SAN (styrene/acrylonitrile), AMSAN (α-methylstyrene/acrylonitrile), styrene/maleimide, SMSAN (styrene/maleic acid (anhydride)/acrylonitrile polymers or SMA (styrene/maleic anhydride).

Preferably, component d1) is a copolymer of
d11) from 60 to 100% by weight and preferably from 65 to 80% by weight of units of a vinylaromatic monomer, preferably styrene, a substituted styrene or a (meth)acrylate or a mixture thereof, particularly of styrene and/or α-methylstyrene, d12) from 0 to 40% by weight and preferably from 20 to 35% by weight of units of an ethylenically unsaturated monomer, preferably acrylonitrile or methacrylonitrile or methyl methacrylate (MMA), particularly acrylonitrile.

According to one embodiment of the invention it is composed of 60–99% by weight of vinylaromatic monomers and 1–40% by weight of at least one of the other monomers stated.

In one embodiment of the invention the component d1) used is a copolymer of styrene and/or α-methylstyrene with acrylonitrile. The acrylonitrile content in these copolymers is 0–40% by weight and preferably 20–35% by weight, based on the total weight of d1).

The thermoplastic molding compositions D can, furthermore, contain, as matrix polymer, in addition to d1) or alone, preferably at least one polymer selected from the group consisting of partially crystalline polyamides, partially aromatic polyamides, polyesters, polyoxyalkylenes, polycarbonates, polyarylene sulfides and polyether ketones. Alternatively, mixtures of two or more of said polymers can be used. Of course, it is possible to use mixtures of different individual polymers, e.g., mixtures of different polyamides, different polyesters or different polycarbonates, as matrix polymers.

Suitable polymers d2) in the molding composition of the invention are partially crystalline, preferably linear, polyamides such as polyamide-6, polyamide-6,6, polyamide-4,6, polyamide-6,12 and partially crystalline copolyamides (d3) based on these components. Furthermore, partially crystalline polyamides can be used whose acid component consists completely or partially of adipic acid and/or terephthalic acid and/or isophthalic acid and/or suberic acid and/or sebacic acid and/or azelaic acid and/or dodecanedicarboxylic acid and/or a cyclohexanedicarboxylic acid, and whose diamine component consists completely or partially of, in particular, m- and/or p-xylylenediamine and/or hexamethylenediamine and/or 2,2,4- and/or 2,4,4-trimethylhexamethylenediamine and/or isophronediamine, and the composition of which is basically known from the prior art.

Additionally, the polymers d4) used can be polyesters, preferably aromatic-aliphatic polyesters. Examples are polyalkylene terephthalates, based, for example, on ethylene glycol, 1,3-propanediol, 1,4-butanediol, 1,6-hexanediol and 1,4-bishydroxymethylcyclohexane, and also polyalkylene naphthalates.

Furthermore, polymers d5) used can be polyoxyalkylenes, e.g., polyoxymethylene.

Suitable polycarbonates d6) are known per se or can be obtained by known methods. Preference is given to polycarbonates based on diphenyl carbonate and bisphenols. The preferred bisphenol is 2,2-di(4-hydroxyphenyl)propane, generally referred to, as below, as bisphenol A.

Instead of bisphenol A use can be made of other aromatic dihydroxy compounds, particularly 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfide, 4,4'-dihydroxydiphenylmethane, 1,1-di(4-hydroxyphenyl)ethane, 4,4-dihydroxybiphenyl or dihydroxydiphenylcycloalkanes, preferably dihydroxydiphenylcyclohexanes or dihydroxylcyclopentanes, particularly 1,1-bis(4-hydroxyphenyl)-3,3,5-trimethylcyclohexane and also mixtures of the aforementioned dihydroxy compounds.

Particularly preferred polycarbonates are those based on bisphenol A or bisphenol A together with up to 80 mol % of the aforementioned aromatic dihydroxy compounds.

Alternatively, copolycarbonates can be used; of particular interest are copolycarbonates based on bisphenol A and di(3,5-dimethyldihydroxyphenyl) sulfone, which are characterized by high heat distortion resistance.

Also suitable are polyarylene sulfides, particularly polyphenylene sulfide.

Furthermore, molding compositions D can contain, as a further component, additives E.

Preferred thermoplastic molding compositions contain, as component E, 0–50% by weight, preferably 0–40% by weight and more preferably 0–30% by weight of fibrous or particulate fillers or mixtures thereof, based, in each case, on the total molding composition.

If used, reinforcing agents such as carbon fibers and glass fibers are usually employed in amounts of 5–50% by weight based on the total molding composition.

The glass fibers used can be of glass type E, A or C and are preferably coated with size and adhesion promoter. Their diameter is generally from 6 to 20 μm. It is possible to use rovings or chopped strands (staple fibers) having a length of 1–10 μm and preferably 3–6 μm.

Furthermore, fillers or reinforcing materials, such as glass beads, mineral fibers, whiskers, aluminum oxide fibers, mica, quartz powder and wollastonite, can be added.

In addition, metal flakes, e.g., aluminum flakes, metal powders, metal fibers, metal-coated fillers, e.g., nickel-coated glass fibers, and other additives capable of shielding against electromagnetic waves may be blended into molding compositions D. Furthermore, the molding compositions can be mixed with additional carbon fibers, carbon black, in particular conductive carbon black, or nickel-coated C fibers.

Molding compositions D can contain other additives as well. As examples thereof there may be mentioned: dyes, pigments, colorants, antistatic agents, antioxidants, stabilizing agents for improving thermostability, increasing light stability, improving resistance to hydrolysis and resistance to chemicals, agents counteracting thermal decomposition and, in particular, lubricants or release agents, which are advantageous when manufacturing shaped articles or moldings or films. Metering of these further additives can take place at any stage of the process for the manufacture of D, but preferably early on, in order to exploit the stabilizing action (or other specific effects) of the respective additive at an early stage.

Suitable stabilizers are for example hindered phenols, but also vitamin E or compounds having an analogous structure, and butylated condensation products of p-cresol and dicyclopentadiene and also HALS stabilizers (Hindered Amine Light Stabilizers), benzophenones, resorcinols, salicylates and benzotriazoles. Other suitable compounds are e.g., thiocarboxylates. Preference is given to $C_6$–$C_{20}$ fatty acid esters of thiopropionic acid, stearyl and lauryl esters being particularly preferred. Very special reference is given to the use of dilauryl thiodipropionate, distearyl thiodipropionate or mixtures thereof. Further additives are for example HALS absorbers, such as bis(2,2,6,6-tetramethyl-4-piperidyl) sebacate, or UV absorbers such as 2H-benzotriazol-2-yl-4-methylphenol. Such additives are usually employed in amounts of up to 2% by weight (based on the total mixture).

Suitable lubricants and mold release agents are stearic acids, stearyl alcohol, stearates, amide waxes (bis-stearylamide), polyolefin waxes or, generally, higher fatty acids, derivatives thereof and mixtures of such fatty acids containing from 12 to 30 carbons. The amounts of these additives are in the range from 0.05 to 5% by weight.

In addition, silicone oils, oligomeric isobutylene or similar materials are suitable for use as additives. If used, the usual concentrations thereof are from 0.001 to 5% by weight. Pigments, dyes, color brighteners, such as ultramarine blue, phthalocyanines, titanium(IV) oxide, cadmium sulfides, derivatives of perylenetetracarboxylic acid are also useful.

Processing assistants and stabilizers such as UV stabilizers, lubricants and antistatic agents, if used, are usually employed in amounts of from 0.01 to 5% by weight, based on the total molding composition.

Mixing of graft polymers C with the other constituents to produce molding compositions D may be carried out by any known method and in any desired manner. However, blending of the components is preferably carried out by coextruding, kneading or roll-milling the components at temperatures of, say, from 180 to 400° C., the components having been previously isolated if necessary from the solution or aqueous dispersion obtained in the polymerization. The products of the graft copolymerization (component C), obtained in aqueous dispersion, can for example be only partially dewatered and mixed as moist crumbs with the matrix polymers, in which case drying of the graft copolymers is completed during the mixing operation.

The molding compositions can be processed to shaped articles, films or fibers.

According to one embodiment of the invention, these can be prepared from molding compositions D by known methods of processing thermoplastics. In particular, production may be effected by thermoforming, extruding, injection molding, calendering, blow molding, pressing, pressure sintering, deep drawing or sintering, preferably by injection molding.

The molded articles prepared from molding compositions D are characterized by relatively high impact strengths. In addition, they have an improved surface quality, particularly greater luster.

The invention is illustrated below with reference to the following examples.

EXAMPLES

Test Methods

Charpy Impact Strength (ak [$kJ/m^2$])

Tests were carried out on specimens (80×10×4 mm, prepared according to ISO 294 in a family mold at a mass temperature of 240° C. and a mold temperature of 50° C.) at 23° C. and −40° C. according to ISO 179-2/leA (F).

Puncture Resistance (Multiaxial Toughness) [Nm]

Tests were carried out according to ISO 6603-2 on plates (60×60×2 mm, prepared according to ISO 294 in a family mold at a mass temperature of 240° C. and a mold temperature of 50° C.)

Flowability (MVR [ml/10'])

Tests were carried out according to ISO 1133 B on the polymer melt at 220° C. under a load of 10 kg Elasticity (Modulus of Elasticity [MPa])

Tests were carried out according to ISO 527-2/1A/50 on specimens (prepared according to ISO 294 at a mass temperature of 250° C. and a mold temperature of 60° C.)

Amount of Coagulum

The amount of coagulum relative to the graft rubber is determined after filtration through a sieve having a mesh size of about 1 mm, dried at 80° C. under nitrogen (200 mbar) for 17 hours.

Particle Size

The mean particle size d stated is the weight average of the particle size, as determined with an analytical ultracentrifuge following the method of W. Mächtle, S. Harding (Eds.), AUC in Biochemistry and Polymer Science, Royal Society of Chemistry Cambridge, UK 1992 pp. 1447–1475. The ultracentrifuge readings give the integral mass distribution of the particle diameter in a sample. This makes it possible to determine what percentage by weight of the particles have a diameter equal to or smaller than a specific size.

The weight-average particle diameter $d_{50}$ indicates that particle diameter at which 50% by weight of all particles have a larger particle diameter and 50% by weight have a smaller particle diameter.

Swell Index and Gel Content [%]

A film was prepared from the aqueous dispersion of the graft base by evaporating the water. To 0.2 g of this film there were added 50 g of toluene. After a period of 24 hours the toluene was removed from the swollen sample by filtration with suction and the sample was weighed. After drying in vacuo at 110° C. over a period of 16 hours, the sample was reweighed. The indicators were calculated as follows:

$$\text{Swell index } SI = \frac{\text{mass of swollen, suction-filtered specimen}}{\text{mass of vacuum-dried specimen}}$$

$$\text{Gel content} = \frac{\text{mass of vacuum-dried specimen}}{\text{initial mass of unswollen specimen}} \cdot 100\%$$

Butadiene Rubber ($A_1$ to $A_5$)

Synthesis of the butadiene rubber ($A_1$ to $A_5$) took place by emulsion polymerization by the feed process. As comonomer 10% by weight of styrene were used.

The butadiene rubbers had the following properties:

| Rubber | Swell index | Gel content [%] | $d_{50}$ [nm] |
|---|---|---|---|
| $A_1$ | 19 | 77 | 109 |
| $A_2$ | 28 | 74 | 100 |
| $A_3$ | 17 | 86 | 116 |
| $A_4$ | 22 | 76 | 104 |
| $A_5$ | 28 | 72 | 106 |

Experiment a (for Comparison)

To 60.47 kg of a dispersion of $A_1$ in water (solids content 43% by weight) there were added, at 55° C., 6.5 kg of a dispersion of copolymer $B_1$ (solids content 10% by weight, composition of $B_1$: 95.5% of ethyl acrylate and 4.5% of methacrylamide (MAM)).

To the resulting dispersion of the agglomerated rubber $A_1$ an emulsifier was added. There were then added 0.98 kg of acrylonitrile (AN), 2.52 kg of styrene (S) and tert-dodecyl mercaptan (regulator). The initiator system used was one based on cumene hydroperoxide and dextrose and polymerization was carried out at a temperature in the range from about 60 to about 70° C. There were then added a further 2.94 kg of acrylonitrile, 7.56 kg of styrene and regulator, emulsifier and initiator. On completion of the polymerization reaction 0.05% of silicone oil and 0.6% of a stabilizer mixture, based, in each case, on the total solids, were added and the mixture was allowed to cool down.

The dispersion was precipitated by means of magnesium sulfate solution. The resulting graft rubber $C_{V1}$ was isolated and processed with poly(styrene-co-acrylonitrile) (SAN) having an acrylonitrile content of 24% by weight, by extrusion, to form a molding composition $D_{V1}$ having a content of 29% by weight of $C_{V1}$.

Experiment b (Invention)

Experiment a was repeated except that 0.27% by weight of KOH, based on the solids content of the dispersion of $A_2$, was added to the dispersion of the rubber prior to the addition of copolymer $B_1$.

The resulting dispersion was precipitated by means of magnesium sulfate solution. The resulting graft rubber $C_1$ was isolated and processed with SAN having an acrylonitrile content of 24% by weight, by extrusion, to form a molding composition $D_1$ having a content of 29% by weight of $C_1$.

Experiment c (Invention)

To 4727.3 g of the dispersion of $A_3$ in water (solids content 44% by weight there were added 11.2 g of a 10% by weight strength KOH solution. The fraction of KOH solids was 0.054% by weight based on the solids content of the dispersion of $A_3$. The mixture was then heated to 55° C. A 10% by weight strength dispersion of copolymer $B_1$ was then added, the added amount of solids of this agglomerating dispersion being 2.5% of the solids content of the polybutadiene dispersion.

14.4 g of a 10% by weight strength KOH solution, emulsifier and water were then added and stirring was continued for a few minutes.

78.4 g of acrylonitrile, 201.6 g of styrene and tert-dodecyl mercaptan were then added. The reaction mixture was heated and an initiator system based on cumene hydroperoxide and dextrose was added thereto, and the mixture was polymerized at about 70° C. A further 235.2 g of acrylonitrile, 604.8 kg of styrene and regulator and also emulsifier, initiator and water and 3.84 g of a 10% by weight strength solution of KOH in water were then added. On completion of the polymerization reaction 0.05% of silicone oil and 0.6% of a stabilizer mixture, based, in each case, on the total solids content, were added and the mixture was allowed to cool down.

The dispersion was precipitated by means of magnesium sulfate solution. The resulting graft rubber $C_2$ was isolated and processed with SAN having an acrylonitrile content of 28% by weight, by extrusion, to form a molding composition $D_2$ having a content of 29% by weight of $C_2$.

Experiment d (Invention)

Experiment c was repeated except that 0.11% by weight of KOH based on the solids content of the dispersion of $A_3$ was added to the dispersion of the rubber prior to addition of copolymer $B_1$.

The resulting dispersion was precipitated by means of magnesium sulfate solution. The resulting graft rubber $C_3$ was isolated and processed with SAN having an acrylonitrile content of 28% by weight, by extrusion, to form a molding composition $D_3$ having a content of 29% by weight of $C_3$.

Experiment e (Invention)

Experiment c was repeated except that 0.27% by weight of KOH, based on the solids content of the dispersion of $A_3$, was added to the dispersion of the rubber prior to the addition of copolymer $B_1$.

The dispersion was precipitated by means of magnesium sulfate solution. The resulting graft rubber $C_4$ was isolated and processed with SAN having an acrylonitrile content of 28% by weight, by extrusion, to form a molding composition $D_4$ having a content of 29% by weight of $C_4$.

Experiment f (For Comparison)

To 4952.4 g of a dispersion $A_2$ (solids content 42% by weight) in water there was added, at about 70° C., a 10% by weight strength agglomerating dispersion of $B_2$ (composition of $B_2$: 96% of ethyl acrylate and 4% of MAM), the added amount of solid material of the agglomerating dispersion being 4% of the solids content of the polybutadiene dispersion.

Following agglomeration, emulsifier and initiator (potassium persulfate) were added. 46.67 g of acrylonitrile, 140 g of styrene and regulator were then added. A mixture of 233.33 g of acrylonitrile, 700 g of styrene and regulator was then added over a period of 190 minutes, the temperature being raised to 77° C. after over half of the time. On completion of the addition of monomer, initiator was again added and the polymerization was continued.

To the dispersion there were added 0.02% by weight of silicone oil and 0.2% by weight of a stabilizer, based, in each case, on the total solids content, and the mixture was cooled.

The dispersion was precipitated by means of magnesium sulfate solution. The resulting graft rubber $C_{V2}$ was isolated and processed with SAN having an acrylonitrile content of 24% by weight, by extrusion, to form a molding composition $D_{V2}$ having a content of 29% by weight of $C_{V2}$.

Experiment g (Invention)

Experiment f was repeated except that additionally 0.54% of KOH, based on the solids content of the polybutadiene dispersion, was added.

The dispersion was precipitated by means of magnesium sulfate solution. The resulting graft rubber $C_5$ was isolated and processed with SAN having an acrylonitrile content of 24% by weight, by extrusion, to form an ABS molding composition $D_5$ having a content of 29% by weight of $C_5$.

Experiment h (Invention)

Experiment f was repeated except that additionally 0.27% of KOH, based on the solids content of the polybutadiene dispersion, was added. The added amount of solid material in the agglomerating dispersion was 2.5% of the solids content of the polybutadiene dispersion.

The dispersion was precipitated by means of magnesium sulfate solution. The resulting graft rubber $C_6$ was isolated and processed with SAN having an acrylonitrile content of 24% by weight, by extrusion, to form a molding composition $D_6$ having a content of 29% by weight of $C_6$.

Experiment i (Invention)

Experiment f was repeated except that additionally 0.27% of KOH, based on the solids content of the polybutadiene dispersion, was added. The added amount of solid material in the agglomerating dispersion of $B_3$ (composition of $B_3$: 94% of ethyl acrylate and 6% of MAM) was 2.5% of the solids content of the polybutadiene dispersion.

The dispersion was precipitated by means of magnesium sulfate solution. The resulting graft rubber $C_7$ was isolated and processed with SAN having an acrylonitrile content of 24% by weight, by extrusion, to form a molding composition $D_7$ having a content of 29% by weight of $C_7$.

Experiment j (Invention)

To 5580 g of a dispersion $A_4$ (solids content 40% by weight) in water there was added, at about 70° C., 0.37% by weight strength KOH, based on the solids content of the dispersion of $A_4$. Then a 10% by weight strength agglomerating dispersion of $B_2$ (composition of $B_2$: 95.5% of ethyl acrylate and 4.5% of MAM), the added amount of solid material of the agglomerating dispersion being 1.5% of the solids content of the polybutadiene dispersion.

Following agglomeration, emulsifier and initiator (potassium persulfate) were added. 47.9 g of acrylonitrile and 180 g of styrene were then added. A mixture of 239 g of acrylonitrile and 900 g of styrene was then added over a period of 190 minutes, the temperature being raised to 77° C. after over half of the time. On completion of the addition of monomer, initiator was again added and the polymerization was continued.

To the dispersion there was added 0.2% by weight of a stabilizer, based on the total solids content, and the mixture was cooled.

The dispersion was precipitated by means of magnesium sulfate solution. The resulting graft rubber $C_8$ was isolated and processed with SAN having an acrylonitrile content of 24% by weight, by extrusion, to form a molding composition $D_8$ having a content of 29% by weight of $C_8$.

Experiment k (Invention and for Comparison)

Experiment j was repeated except that additionally the type and amount of electrolyte indicated in Table 4, based on the solids content of the polybutadiene dispersion, were added.

The dispersion was precipitated by means of magnesium sulfate solution. The resulting graft rubber $C_9$ to $C_{11}$ and $C_{v3}$ to $C_{v7}$ was isolated and processed with SAN having an acrylonitrile content of 24% by weight, by extrusion, to form an ABS molding composition $D_9$ to $D_{11}$ and $D_{v3}$ to $D_{v7}$ having a content of 29% by weight of $C_9$ to $C_{11}$ and $C_{v3}$ to $C_{v7}$, respectively Experiment l (Invention and For Comparison)

The procedure of experiment j was repeated. The rubber used was the rubber $A_5$.

The agglomerating polymer used was the copolymer $B_1$. For comparison, the copolymers $B_{v1}$ to $B_{v4}$ were used, containing acrylic acid or methacrylic acid groups and being prepared as follows:

Preparation of $B_1$ 333 g of ethyl acrylate, water, emulsifier and potassium persulfate were introduced as an initial charge, adjusted to a pH of from 8 to 9, and stirred at 80° C. Then a further 2681 g of ethyl acrylate, 126 g of meth acrylamide, emulsifier, water and free-radical initiator were metered in. After about 4½ hours, the reaction mixture was cooled to room temperature and the resulting dispersion was diluted in water to 10% by weight.

Preparation of $B_{v1}$

The procedure described under $B_1$ was repeated but initially introducing 360 g of ethyl acrylate and metering in 2905 g of ethyl acrylate and, instead of methyl acrylate, 136 g of acrylic acid.

After the reaction mixture had been cooled to room temperature, the dispersion was diluted to 10% by weight with an aqueous KOH solution containing an amount of KOH equimolar with the acrylic acid.

Preparation of $B_{v2}$

The procedure described under $B_{v1}$ was repeated but using methacrylic acid instead of acrylic acid.

Preparation of $B_{v3}$

The procedure described under $B_{v1}$ was repeated except that the dispersion was diluted to 10% by weight with water instead of aqueous KOH solution.

Preparation of $B_{v4}$

The procedure described under $B_{v2}$ was repeated except that the dispersion was diluted to 10% by weight with water instead of aqueous KOH solution.

When using $B_{v3}$ and $B_{v4}$, an equimolar amount of KOH with respect to acrylic acid or methacrylic acid, respectively, was added in addition to the amount of KOH stated in Table 5.

The results of the experiments are compiled in Table 5.

TABLE 1

|  | Comparison | Invention |
| --- | --- | --- |
| Experiment | a | b |
| Rubber A | $A_1$ | $A_2$ |
| Ratio of AN/S in C | 28/72 ($C_{v1}$) | 28/72 ($C_1$) |
| Conc. of MAM in $B_1$ [%] | 4.5 | 4.5 |
| Amount of $B_1$ [%] | 2.5 | 2.5 |
| Electrolyte | none | KOH |
| Amount of electrolyte [%] |  | 0.27 |
| Initiator | Redox | Redox |
| pH (following grafting) | 9.58 | 9.92 |
| Particle size of C $d_{50}$ [nm] | 238 | 369 |
| Conc. of AN in SAN [%] | 24 | 24 |
| ak (23° C.) [kJ/m²] | 13.6 | 19.7 |
| ak (−40° C.) [kJ/m²] | 4 | 9.1 |
| Puncture resistance [Nm] | 23.6 | 21.2 |
| MVR (220/10) [cm³/10 min] | 16.4 | 17.7 |
| E modulus [MPa] | 2080 | 2040 |
| Coagulum [%] | 1.2 | 0.3 |

TABLE 2

|  | Invention | Invention | Invention |
| --- | --- | --- | --- |
| Experiment | c | d | e |
| Rubber A | $A_3$ | $A_3$ | $A_3$ |
| Ratio of AN/S in C | 28/72 ($C_2$) | 28/72 ($C_3$) | 28/72 ($C_4$) |
| Conc. of MAM [%] in B | 4.5 | 4.5 | 4.5 |
| Amount of B [%] | 2.5 | 2.5 | 2.5 |
| Electrolyte | KOH | KOH | KOH |
| Amount of electrolyte [%] | 0.054 | 0.11 | 0.27 |
| Initiator | Redox | Redox | Redox |

TABLE 2-continued

|  | Invention | Invention | Invention |
|---|---|---|---|
| pH (following grafting) | 9.82 | 9.97 | 10.28 |
| Particle size of C $d_{50}$ [nm] | 151 | 267 | 325 |
| Conc. of AN in SAN [%] | 28 | 28 | 28 |
| ak (23° C.) [kJ/m$^2$] | 22.2 | 20.7 | 21.3 |
| ak (−40° C.) [kJ/m$^2$] | 7.6 | 7.6 | 7.8 |
| Puncture resistance [Nm] | 27.8 | 25.9 | 26.4 |
| MVR (220/10) [cm$^3$/10 min] | 20.5 | 19.5 | 18.7 |
| E modulus [MPa] | 2230 | 2210 | 2170 |
| Coagulum [%] | 0.15 | 0.15 | 0.075 |

TABLE 3

|  | Comparison | Invention | Invention | Invention |
|---|---|---|---|---|
| Experiment | f | g | h | i |
| Rubber A | A$_2$ | A$_2$ | A$_2$ | A$_2$ |
| Ratio of AN/S in C | 25/75 (C$_{v2}$) | 25/75 (C$_5$) | 25/75 (C$_6$) | 25/75 (C$_7$) |
| Conc. of MAM [%] in B | 4 | 4 | 4 | 6 |
| Amount of B [%] | 4 | 4 | 2.5 | 2.5 |
| Electrolyte | none | KOH | KOH | KOH |
| Amount of electrolyte [%] |  | 0.54 | 0.27 | 0.27 |
| Initiator | KPS | KPS | KPS | KPS |
| Particle size of C $d_{50}$ [nm] | 207 | 350 | 358 | 362 |
| pH (following grafting) | 8.87 | 10.58 | 10.23 | 10.10 |
| Conc. of AN in SAN [%] | 24 | 24 | 24 | 24 |
| ak (23° C.) [kJ/m$^2$] | 11.1 | 25,.3 | 25.2 | 19 |
| ak (−40° C.) [kJ/m$^2$] | 5.8 | 7.5 | 8.3 | 7.3 |
| Puncture resistance [Nm] | 5.7 | 12.3 | 29.4 | 21.4 |
| MVR (220/10) [cm$^3$/10 min] | 23.7 | 21.1 | 20.2 | 23.5 |
| E modulus [MPa] | 2405 | 2367 | 2278 | 2384 |
| Coagulum [%] | 0.06 | 0.08 | 0.02 | 0.06 |

TABLE 4

|  | Invention | Invention | Comparison | Comparison | Comparison | Invention | Invention | Comparison | Comparison |
|---|---|---|---|---|---|---|---|---|---|
| Experiment | j | k | k | k | k | k | k | k | k |
| Rubber A | A$_4$ | A$_4$ | A$_4$ | A$_4$ | A$_4$ | A$_4$ | A$_4$ | A$_4$ | A$_4$ |
| Ratio of AK/S in C | 21/79 (C$_8$) | 21/79 (C$_9$) | 21/79 (C$_{v3}$) | 21/79 (C$_{v4}$) | 21/79 (C$_{v5}$) | 21/79 (C$_{10}$) | 21/79 (C$_{11}$) | 21/79 (C$_{v6}$) | 21/79 (C$_{v7}$) |
| Conc. of MAM [%] in B | 4.5 | 4.5 | 4.5 | 4.5 | 4.5 | 4.5 | 4.5 | 4.5 | 4.5 |
| Amount [%] in B | 1.5 | 1.5 | 1.5 | 1.5 | 1.5 | 2.5 | 2.5 | 2.5 | 2.5 |
| Electrolyte | KOH | NaOH | NaHCO$_3$ | KCl | K$_2$SO$_4$ | KOH | NaOH | NaHCO$_3$ | K$_2$SO$_4$ |
| Amount of electrolyte [%] | 0.37 | 0.2638 | 0.5542 | 0.4906 | 0.5734 | 0.27 | 0.1925 | 0.4044 | 0.4193 |
| Initiator | KPS | KPS | KPS | KPS | KPS | KPS | KPS | KPS | KPS |
| pH (following grafting) | 11.26 | 11.58 | 8.84 |  |  | 10.61 | 10.56 |  |  |
| PSD of C $d_{50}$ [nm] D50 [nm] | 140 | 141 | 135 |  |  | 324 | 299 |  |  |
| Conc. of AN in SAN [%] | 24 | 24 | 24 |  |  | 24 | 24 |  |  |
| PB content (sec.) [%] | 29.1 | 29.2 | 28.3 |  |  | 28.3 | 29.5 |  |  |
| ak 23° C. [kJ/m$^2$] | 23.3 | 23 | 23.1 |  |  | 21.4 | 22.3 |  |  |
| ak −40° C. [kJ/m$^2$] | 7.2 | 7.6 | 8.1 |  |  | 7.8 | 7.9 |  |  |
| Puncture resistance 23 ° C. [Nm] |  |  |  |  |  |  |  |  |  |
| MVR 220/10 [ml/10 min] | 16.3 | 16.4 | 17.1 |  |  | 16.8 | 15.9 |  |  |
| Vicat B50 [° C.] | 98.3 | 98.3 | 98.5 |  |  | 98.4 | 98.2 |  |  |
| Coagulum (t) grams | 3.6 | 12.35 | 137.4 |  |  | 0.8 | 0.8 |  |  |
| Coagulum (%) | 0.11 | 0.39 | 4.29 | fully coagulated | fully coagulated | 0.03 | 0.03 | coagulated | fully coagulated |

TABLE 5

|  | Invention | Comparison | Comparison | Comparison | Comparison |
|---|---|---|---|---|---|
| Experiment | l | l | l | l | l |
| Rubber A | A$_5$ | A$_5$ | A$_5$ | A$_5$ | A$_5$ |
| Ratio of AN/S in C | 21/79 (C$_{12}$) | 21/79 (C$_{v8}$) | 21/79 (C$_{v9}$) | 21/79 (C$_{v10}$) | 21/79 (C$_{v11}$) |
| B | B$_1$ | B$_{v1}$ | B$_{v2}$ | B$_{v3}$ | B$_{v4}$ |
| Amount [%] in B | 1.5 | 1.5 | 1.5 | 1.5 | 1.5 |
| Electrolyte | KOH | KOH | KOH | KOH | KOH |
| Amount of electrolyte [%] | 0.27 | 0.27 | 0.27 | 0.27 | 0.27 |
| Initiator | KPS | KPS | KPS | KPS | KPS |
| pH (following grafting) | 10.94 | 11.4 | 10.93 | 10.77 | 10.86 |
| PSD of C $d_{50}$ [nm] D50 [nm] | n.g. | n.g. | n.g. | n.g. | n.g. |
| Conc. of AN in SAN [%] | 24 | 24 | 24 | 24 | 24 |
| PB content (sec.) [%] | 28.3 | 28.5 | 28.9 | 28.2 | 28.3 |
| ak 23° C. [kJ/m$^2$] | 25.5 | 25.1 | 25.5 | 25.2 | 25.1 |
| ak −40° C. [kJ/m$^2$] | 5.5 | 5.5 | 5.6 | 5.3 | 5.4 |
| Puncture resistance 23° C. [Nm] | 19.3 | 13.9 | 18.3 | 18.2 | 16.0 |
| MVR 220/10 [ml/10 min] | 20.1 | 19.4 | 18.1 | 20.9 | 20.1 |
| Vicat B50 [° C.] | 96.3 | 96.2 | 95.7 | 95.9 | 95.8 |
| Coagulum (t) grams | 1.7 | 42.2 | 9.2 | 39.1 | 12.1 |
| Coagulum (%) | 0.05 | 1.32 | 0.29 | 1.22 | 0.38 | n.g.: not gauged

What is claimed is:

1. A process for the agglomeration of at least one rubber (A), dispersed in an aqueous phase, by the addition of a dispersion of at least one agglomerating polymer (B) in aqueous phase, wherein the agglomerating polymer (B) used is a copolymer of at least one $C_1$–$C_{12}$-alkyl acrylate or $C_1$–$C_{12}$-alkyl methacrylate or a mixture thereof and at least one acrylamide or maleamide or a mixture thereof, which copolymer is substantially free of acid groups, and the agglomeration is carried out in the presence of at least one basic electrolyte comprising an organic or inorganic hydroxide.

2. A process as claimed in claim 1, wherein the agglomerating polymer (B) used is a copolymer of (based on B):

b1) from 80 to 99.9% by weight of at least one ($C_1$–$C_4$ alkyl)ester of acrylic acid and b2) from 0.1 to 20% by weight of acrylamide.

3. A process as claimed in claim 1, wherein the basic electrolyte used is KOH.

4. A process as claimed in any of claim 1, wherein the rubber (A) used is a diene rubber of (based on A):

a1) from 50 to 100% by weight of at least one diene having conjugated double bonds and a2) from 0 to 50% by weight of one or more other monoethylenically unsaturated monomers.

5. A process as claimed in claim 1, wherein the basic electrolyte is used in an amount of from 0.01 to 1.5% by weight based on (A).

6. A graft polymer (C) containing (based on C):

c1) from 30 to 95% by weight of rubber (A) agglomerated by the process as claimed in claim 1 and c2) from 5 to 70% by weight of a graft base.

7. A thermoplastic molding composition (D) comprising a graft polymer (C) as claimed in claim 6.

* * * * *